Figure 1:
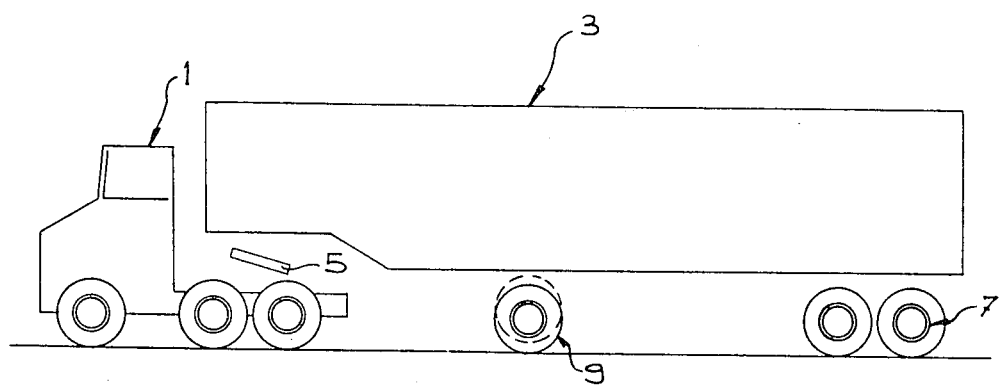

United States Patent [19]

Picard

[11] 4,383,696
[45] May 17, 1983

[54] BRAKE CONTROL SYSTEM FOR THE RETRACTIBLE AUXILIARY WHEEL TRAIN OF A TRUCK TRAILER

[76] Inventor: Réal Picard, 170 des Marguerites, St-Rédempteur, Quebec, Canada, G0S 3B0

[21] Appl. No.: 310,865

[22] Filed: Oct. 13, 1981

[30] Foreign Application Priority Data

Oct. 14, 1980 [CA] Canada .................................. 362291

[51] Int. Cl.³ .............................................. B62D 1/02
[52] U.S. Cl. .................................. 280/81 R; 280/767; 280/427; 280/43.23; 180/209
[58] Field of Search ...................... 180/209; 280/43.23, 280/81 R, 427, 767

[56] References Cited

U.S. PATENT DOCUMENTS

| | | | |
|---|---|---|---|
| 2,232,754 | 2/1941 | Winn | 280/427 |
| 3,093,388 | 6/1963 | Kulyk | 280/81 R |
| 3,161,418 | 12/1964 | Brennan et al. | 280/767 |
| 3,482,885 | 12/1969 | Campanini | 188/3 R |

Primary Examiner—David M. Mitchell
Assistant Examiner—Kenneth R. Rice
Attorney, Agent, or Firm—Thierry Orlhac

[57] ABSTRACT

A system for raising and lowering an auxiliary retractable wheel train of a truck trailer to permit neutralizing the braking mechanism of the wheels of the auxiliary train when the latter rises. A selection valve for rising and falling of the auxiliary retractible wheel train cooperates with a relay slide valve which, according to whether it is opened or closed, allows or cuts off the flow of braking fluid in the piping across which relay valve is mounted.

6 Claims, 3 Drawing Figures

BRAKE CONTROL SYSTEM FOR THE RETRACTIBLE AUXILIARY WHEEL TRAIN OF A TRUCK TRAILER

The present invention relates to an additional pneumatic and/or hydraulic circuit for controlling braking action and is specially adapted to neutralize the braking action on the auxiliary retractible wheel train of a truck trailer when it is intended to raise the aforesaid wheel train.

By retractible wheel train, is meant a system mainly used on truck trailers of the van type generally comprising a tracting vehicle to the end of which is pivotally connected a trailer of large size. Because of their lengths, these trailers when subjected to the maximum load authorized by road regulations, strongly tend to bend longitudinally. This bending, which is further notable when the trailer rides across an open gutter or the like, may cause the trailer side members to break.

To avoid this inconvenience, many heavy-duty vehicule manufacturers have added an auxiliary wheel train located at a critical point along the trailer, that is substantially midway between a coupling plate connection and the double rear wheel tandem. However, this auxiliary wheel train cannot be made to permanently rest on the ground for the following reasons: when the trailer is empty, to avoid unnecessary wear of the wheel tires but the main reason is when the truck has to make a sharp turn. In such a case and because this auxiliary wheel train does not have any stearing mechanism, it is then forced to slip in a skidding motion where the tires are drawn laterally. This is the reason why these auxiliary wheel trains are equipped with a pneumatic mechanism, actuated by the driver inside the truck cab, when it is desired to raise or lower them.

These auxiliary wheel trains have, however, a major disadvantage. When they are in operation, the radial load applied to them is generally so heavy that the train, when it has to be lifted in approaching a sharp curve, must be lifted slowly and progressively to avoid that the trailer break should it fall too suddenly. Should the driver have to brake during the raising operation, the braking pressure exerted on the brake drums of the retractible train is identical to that applied on the other wheels of the truck but since the load on the auxiliary wheel train decreases as it rises, it can no longer force the wheels to turn and the latter therefore get locked while they are still in contact with the road, thus causing wear of the wheel tires of the auxiliary train at a fixed point rather than along their periphery. This problem often causes the tires to blow out or at least damage them seriously in the long run by "polygonizing" the tire tread.

In order to avoid the aforementioned second disadvantage, that is deterioration of the tires of the auxiliary wheel train in case of an untimely braking action during raising of the train, control systems have been proposed which are provided with electromagnetic valves connected to the transmission of the tracting vehicle. An example of this is to be seen in U.S. Pat. No. 3,161,418, granted in 1964 to A. Brennan et al.

Unfortunately, none of the known systems provides for automatic neutralization of the braking action on the auxiliary wheel train as the latter rises. In the above-cited patent, the vehicle driver must himself open or close a switch connected to the electromagnetic valve which means that he may either forget it or make a wrong maneuvre.

An object of the present invention lies in the provision of an improvement in the raising and lowering system of an auxiliary retractible wheel train for a truck trailer capable of making the aforesaid operation fully automatic.

The pneumatic circuit of the invention is characterized in that it uses the air pressure necessary for retracting the auxiliary wheel train. Generally, the auxiliary wheel train is mounted at the center of a platform pivoted at one end on an axle connected to the frame of the trailer, the other end being solid with the lower face of at least one flexible rubber cylinder of which the upper face is secured to a stationary upper point of the same frame. This cylinder, connected to a pressure fluid tank by a piping controlled by a rotary spool valve, when subjected the fluid pressure expands and forces the pivoting platform to fall thus causing the wheels of the train with which it is solid to be applied against the ground. The raising operation is carried out by means of another flexible cylinder, identical to the first one, of which the lower face is, this time, secured to the frame of the trailer while the upper face bears against a movable plate connected to the platform supporting the auxiliary wheel train by means of traction rods. The pressurized air blown into this flexible cylinder expands it, causing raising of its upper plate, vertically driving the traction rod connected to the platform supporting the auxiliary wheel train while rising it, whereas the pressurized air contained in the first cylinder is exhausted to atmosphere by the very same rotary spool valve which alternatively inflates one flexible cylinder while simultaneously deflating the other.

The present invention uses the pressure exerted inside the lower cylinder, that is the one that applies the auxiliary wheel train against the ground. A branch line provided between the rotary spool valve and the lower cylinder is connected to a slide valve, the latter comprising two coaxial pistons. A first one of these two pistons close a chamber which is connected to the aforesaid branch line which, when under pressure, drive the two pistons at the bottom of their chamber. The second one of these two pistons or slide pistons, according to whether it is in open of closed position, cuts off or allows the passage of the braking fluid of the auxiliary wheel train in the line of which the slide valve is connected.

The retracting action of the wheel train is obtained by the expansion of the upper flexible cylinder, under one hand, and the pressure drop in the lower cylinder, on the other hand. This pressure drop frees the piston of the slide valve which comes to its initial position under the action of a return spring, drawing the slide piston which in turn cuts off the braking circuit of the auxiliary wheel train, whereby preventing any braking action of the auxiliary wheel train as it rises.

These various means are all connected to a central pressure system which controls and directs them.

Figure 2:
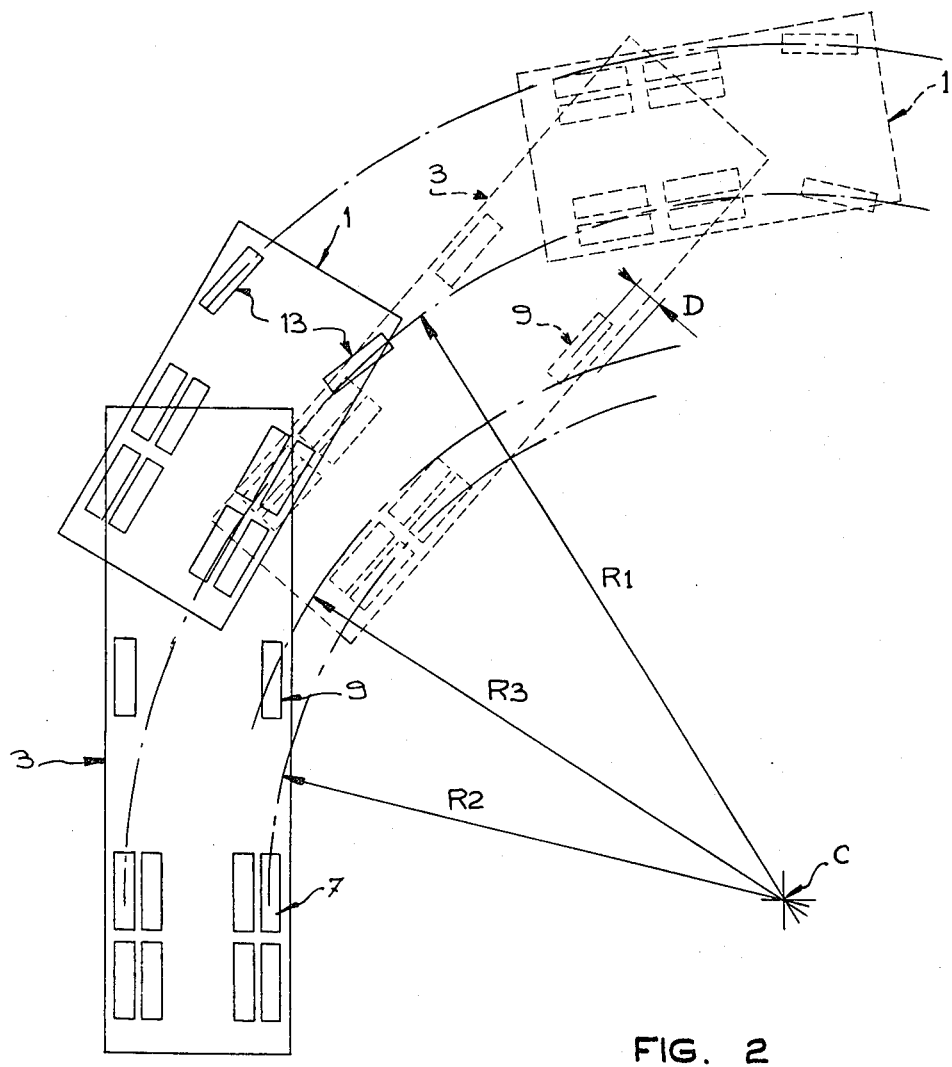
Figure 3:
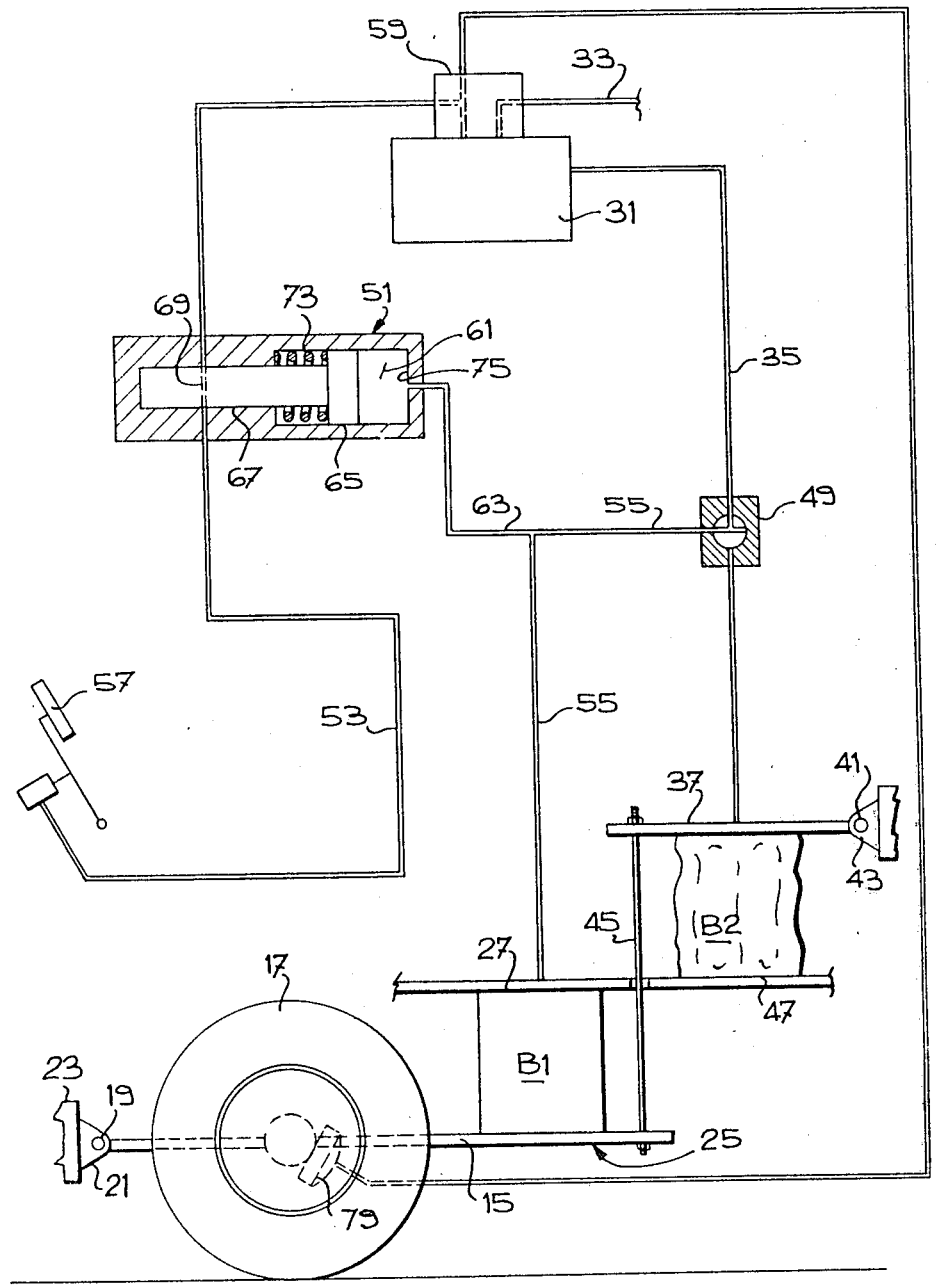

The invention will be better understood from the following description of a non-limitative embodiment, the description referring to the appended drawings wherein:

FIG. 1 is a side elevation view of a heavy-duty truck and trailer assembly illustrating a retractible auxiliary wheel train;

FIG. 2 diametrically illustrates the angular and radial geometric distortion causing skidding of the tires of the wheels of the auxiliary train, it being understood that the axle of the train is stationary, and FIG. 3 is a pneumatic diagram of the system for neutralizing braking of the auxiliary wheel train.

FIG. 1 illustrates a truck and trailer assembly comprising a motor truck 1 to which is hooked a trailer 3 which, under one end, goes against a plate 5 of the truck 1 and on an assembly of tandem wheels, on the other end. Centrally between these two bearing points, is located a retractible auxiliary wheel train 9, shown also in broken lines when raised. This known wheel train is used to support the frame of the trailer when the latter is heavily loaded to avoid bending or even breaking of the side members of the trailer particularly when the vehicle travels over bumpy roads.

It is however necessary to be able to retract or raise this auxiliary train when the vehicle travels empty to avoid, for example, unnecessary wear of the wheel tires. It is however mainly useful to raise the wheel train when the vehicle has to make a sharp turn as is frequently the case in cities, on mountain roads and when parking. FIG. 2 is intended to illustrate this necessity. The vehicle, shown in full lines, takes up a sharp curve of center C with the stearing wheels 13 of the tractor 1 already having been turned. After having moved a certain distance in the curve (a movement being shown in dot-and-dash lines), it is noted that the steering wheels 13 of the tractor 1 as well as the tandem wheels 7 have moved along paths concentric to center C, of radii of curvature $R_1$ and $R_2$, whereas the wheels of the auxiliary wheel train show a clear skid of length D with respect to a circle, concentric to center C, of radius $R_3$.

As indicated previously, retraction of the auxiliary wheel train becomes necessary. The method which is best known at the present time resides in using, for that purpose, the pneumatic service circuits of the truck. These circuits generally operate as follows, reference being had to FIG. 3.

A platform 15 supporting the wheel train 17 is articulated at its forward end by an axle 19 connected to a yoke 21 solid with the side members 23 of the trailer frame. Lowering of this platform, oscillating about the axle 19, is caused by the expansion of one or several inflatable flexible cylinders B1, made of flexible rubber, of which the lower face is secured to the movable end 25 of the platform 15 whereas the upper face is solid with a stationary point 27 of the trailer frame. Besides, the flexible cylinders B1 absorb road bumps, giving the assembly a suspension effect. A compressed air tank 31, fed by an inlet piping 33 connected to a compressor integrated to the motor of the truck 1, provides air pressure necessary to inflate the cylinder B1, when required, through the connection piping 35.

The raising operation of the auxiliary wheel train is obtained by means of one or several other flexible cylinders B2, identical to cylinders B1. The lower face of this flexible cylinder B2 is secured to an anchoring point 47 of the frame of the trailer whereas the upper face thereof lies against and is secured to a movable plate 37, articulated at one end to a pivot point 41 connected to the trailer frame by means of a yoke 43. At the other end of this plate 37, oscillatable according to the inflation of deflation of the flexible cylinder B2, are connected one or several traction rods 45 of which the other end is connected to the movable edge 25 of the platform 15 supporting the retractible wheel axle, thereby providing a connection between the two movable parts. Expansion of the cylinder B2, secured against the trailer frame, draws the articulated plate 37 upwardly which, in turn, draws the support platform 15 also upwardly through the traction rods 45.

In order to render possible these two operations of raising and lowering, it is necessary that the lowering cylinder B1 and the rising cylinder B2 be alternatively under pressure or deflated. When the auxiliary wheel train 17 is applied against the ground, the flexible cylinder B1 is under pressure whereas the cylinder B2 is at atmospheric pressure. Inversely, when the wheel train is lifted, the flexible cylinder B2 is put under pressure whereas the cylinder B1 is deflated.

A known T-shaped two-position distributing valve 49 directs the air pressure in one of the flexible cylinder whereas it connects the other cylinder to atmosphere to deflate it, depending upon whether the auxiliary wheel train has to be lowered or retracted.

For the reasons mentioned above, it is necessary that the auxiliary wheel train not be braked when it is rising. In normal operation, the braking system of the auxiliary wheel train 17 is connected to the general braking system of the vehicle. For the above purpose, a slide valve 51 connected across the general brake piping 53, and connected to the pressure conduit 55 of the flexible cylinder B1, controls the flow of pressure air which, released from the pressure tank 31 when the brake pedal 57 acts on a known pneumatic relay 59, reaches a servo-mechanism 79 which starts up the braking action on the wheel train 17.

As shown, the control valve 51 has two concentric cylindrical chambers of different diameters. The larger chamber 61, connected to the pressure piping 55 of the flexible cylinder B1 by a branch line 63, is closed at one end by a piston 65 movable therein. The latter is extended on one side by a small concentric cylindrical rod 67 slidable in the smaller chamber and provided with a transverse fluid passage 69. The body of the slide valve 51 is likewise provided with fluid passages connected to the piping 53 of the braking circuit. When the auxiliary wheel train 17 is being used, pressure air inflating the flexible cylinder B1 also reaches chamber 61 of the valve 51 through the branch line 63 and drives the piston 65 and rod 67 leftward against the action of a spring 73 and so that the rod 67 reaches the bottom of its chamber. In such a position, the passage 69 through the rod 67 joins the two piping sections leading to the relay 59. Under this condition, when the driver presses on the pedal 57, the relay 59 opens to allow pressure air to the servo-mechanism 79 thereby braking the auxiliary wheel train. When the driver wishes to raise the auxiliary wheel train 17, as when about to take up a curve, he first actuates the spool selection valve 49, located inside the driving cab, so that the spool therein moves clockwise from the illustration of FIG. 3. In doing so, the compressed air tank 31 is placed into communication with the flexible cylinder B2 while the air in cylinder B1 and in chamber 61 is exhausted to atmosphere by the selection valve 49. Thus, the air pressure in the chamber 61 immediately drops, causing the piston 65 to move rightward towards the chamber wall 75 under the action of the return spring 73. By the same token, the rod 67, solid with piston 65, likewise moves rightward so that its transverse passage 69 is cut off from the two portions of pipe 53 thereby making the braking action of the driver on wheel train 17 impossible since the relay 59 cannot be operated to release air and send it to the servo-mechanism 79.

The above safety system has the advantage of being easily installable on any trailer trucks using a retractible auxiliary wheel train, whatever be their type or make.

I claim:

1. In a system for raising and lowering an auxiliary retractible wheel train of a truck trailer, of the type comprising:

pressure fluid means for raising or lowering said auxiliary wheel train;

a pressure fluid source to actuate said pressure fluid means;

a selection valve mounted between said pressure fluid means and said pressure fluid source to control the raising or lowering of said auxiliary wheel train;

a braking circuit for the wheels of said auxiliary wheel train the improvement in the provision therewith of:

a relay valve mounted in the said braking circuit of the wheels of said auxiliary wheel train, actuated by said pressure fluid source according to the position of the selection valve in such a manner as to neutralize said auxiliary wheel braking circuit when said auxiliary wheels are rising.

2. A system according to claim 1, characterized in that the said braking circuit of the wheels of the said auxiliary retractible wheel train is a pressure fluid circuit, and in that said relay valve is a slide valve which, according to whether the slide is open or closed, frees or blocks the flow or said pressure fluid in the said braking circuit.

3. A system according to claim 2, characterized in that the slide relay valve comprises two coaxial pistons, solid with one another, slidable in chambers to which they are associated, one of said pistons acting as said slide blocking the flow of said pressure fluid in said braking circuit when the other piston is actuated by said source of pressure fluid.

4. A system according to claim 3, characterized in that the chamber of the other piston is connected to the source of fluid pressure through said selection valve when the latter is in the falling position of said auxiliary wheel train.

5. A system as claimed in claim 4, characterized in that the relay valve further comprises a return spring bringing the two pistons back in such a position that the flow of brake pressure fluid be stopped when the selection valve is in raising position of the auxiliary wheel train.

6. A system as claimed in claim 5, characterized in that the means for raising and lowering said auxiliary wheel train comprises two balloons ensuring rising and falling movements of said auxiliary wheel train as a function of the position of said selection valve and in that said relay valve is located between said selection valve and said balloons for the fall of said auxiliary wheel train.

* * * * *